UNITED STATES PATENT OFFICE.

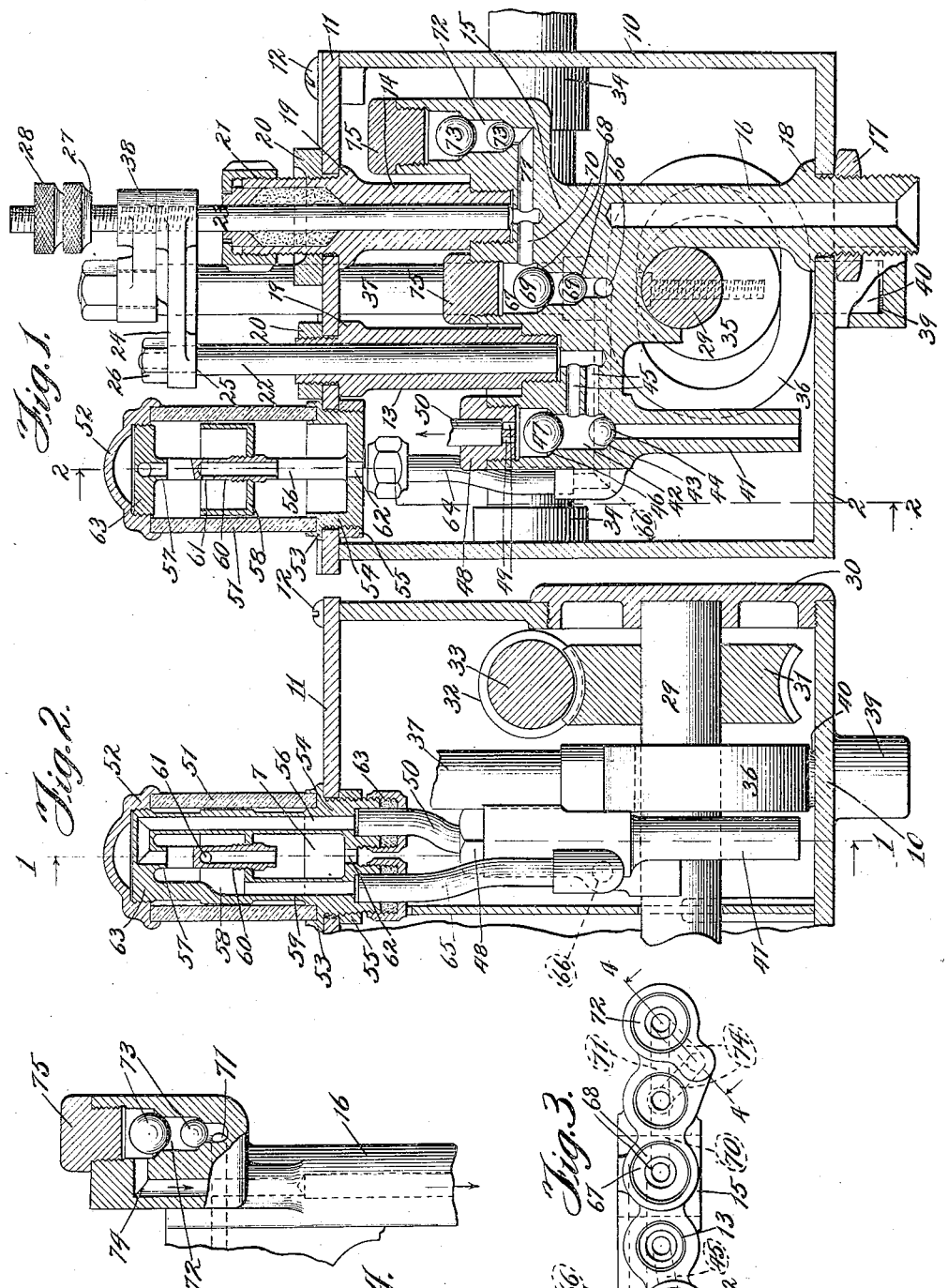

IVAR A. RANDEL, OF CHICAGO, ILLINOIS, ASSIGNOR TO McCORD & COMPANY, OF CHICAGO, ILLINOIS, A CORPORATION OF NEW JERSEY.

LUBRICATOR.

No. 797,867.      Specification of Letters Patent.      Patented Aug. 22, 1905.

Application filed April 8, 1905. Serial No. 254,429.

*To all whom it may concern:*

Be it known that I, IVAR A. RANDEL, a citizen of the United States, residing at Chicago, in the county of Cook and State of Illinois, have invented certain new and useful Improvements in Lubricators, of which the following is a specification, reference being had therein to the accompanying drawings.

This invention relates to improvements in force-feed lubricators; and the objects of the invention will be apparent from the accompanying description.

The invention consists of the combinations and arrangements of parts hereinafter particularly described and then pointed out in the appended claims.

In the drawings, which illustrate one embodiment of the invention, Figure 1 is a vertical sectional view of a force-feed lubricator constructed in accordance with my invention, the view being taken on the line 1 1 of Fig. 2. Fig. 2 is a sectional view on the line 2 2 of Fig. 1. Fig. 3 is a plan view of the body of the coöperating pumps, and Fig. 4 is a sectional view on the line 4 4 of Fig. 3.

Referring to the drawings, 10 indicates a suitable oil-reservoir, which may be of any desired shape and construction, such as the rectangular formation illustrated in the drawings. This reservoir is provided with a cover 11, secured in position as by screws 12. A pair of pumps 13 and 14 is located in the reservoir 10, and these pumps are arranged to coöperate in such manner that the oil is drawn from the reservoir by the pump 13 and delivered thereby to the pump 14, which forces the oil to the part to be lubricated.

As shown in Fig. 1, the barrels of the pumps 13 and 14 have their lower threaded ends screwed into correspondingly-threaded apertures in a body 15, Fig. 3, which has a tubular extension 16, the end of which is screw-threaded and passes through an aperture in the bottom of the reservoir. A nut 17 in threaded engagement with the end of the extension 16 and coöperating with a shoulder 18 on the said extension serves to secure the pump-body to the reservoir. The tubular extension 16 is designed to have connected thereto in any suitable manner a tube or pipe (not shown) leading to the cylinder or other part to be lubricated. As shown in Fig. 1, the barrels of the pumps extend through and are clamped to the cover 11 by means of the shoulders 19 and nuts 20 in threaded engagement with the upper ends of the said barrels. A suitable packing 21 is provided for the plunger of the pump 14 in order to prevent the oil being forced or leaking past the said plunger.

The plungers 22 and 23 of the pumps 13 and 14, respectively, are reciprocated by a common actuating mechanism, and means are preferably provided whereby the stroke of the pump-plungers may be regulated simultaneously and to a similar degree. In the present embodiment of the invention the plungers 22 and 23 are connected by a cross-head 24, one end of which is screwed on the threaded upper end of the plunger 23, while its other end is clamped against a shoulder 25 on the plunger 22 by means of a nut 26. The upper end of the plunger 23 is provided with an adjustable abutment which takes the form of a nut 27, screwing on the said plunger and held in its adjusted position by a set-nut 28.

A shaft 29 is suitably journaled in the ends of the reservoir 10, one end of such shaft, as shown in Fig. 2, having its bearing in a suitable screw-cap 30, adapted to a threaded opening in the end of the reservoir 10. The shaft 29 has fixed thereto a worm-gear 31, which receives motion from a worm 32 on a counter-shaft 33, extending transversely of the reservoir and journaled in suitable bearings 34. One end of the shaft 33 extends beyond the reservoir and is designed to have motion communicated thereto in any suitable manner, as through the medium of a suitable connection with an operating part of the mechanism to be lubricated. The shaft 29 is provided with an eccentric 35, coöperating with an eccentric-sleeve 36, having fixed thereto a vertical rod 37, which is provided at its upper end with an arm 38, having an aperture which freely receives the plunger 23 between the head 24 and the abutment 27.

In order to properly guide the rod 37, the reservoir is provided at its bottom with a guide-socket 39, which receives an extension 40 on the eccentric-sleeve 36. When the rod 37 is reciprocated through the medium of the eccentric 35, owing to the engagement of the arm 38 with the cross-head 24 and adjustable abutment 27, the pump-plungers will be reciprocated simultaneously. The stroke of the pump-plungers may be readily varied by adjusting the abutment 27 so as to eliminate or provide lost motion to the desired degree between the arm 38 and the pump-plungers. The pumps 13 and 14 are of different capacities, and this is due in the present instance to the difference in the size of the pump-barrels and associated plungers, the pump 13 being of greater capacity.

The body 15 is provided with a depending inlet-tube 41, which extends to adjacent the bottom of the reservoir, so as to enable the pump 13 to practically exhaust the contents of the reservoir. The upper end of the tube 41 discharges into a chamber 42, which is provided with a seat 43, to which is adapted a suitable valve 44. One or more ports 45 in the body 15 afford communication between the barrel of the pump 13 and the chamber 42. The chamber 42 is provided above the ports 45 with a seat 46 for a suitable valve 47. A cap 48 closes the chamber 42 and is provided with one or more ports 49, which lead to a pipe 50, extending to a suitable sight-feed device carried by the cover 11 and now to be described.

A sight-feed glass 51 is provided with a cap 52 and a base-ring 53, the latter having a reduced threaded portion 54, which projects through a suitable opening in the cover 11 and receives a nut 55, securing the base-ring to the cover. A tube 56 passes through the base-ring and extends to about the top of the sight-feed glass, where it is provided with an elbow terminating in a central nipple 57. A trap is located in the sight-feed glass 51, and in the present instance this trap comprises a cup 58, having a discharge-opening in its bottom, from which depends a discharge-tube 59. An overflow-tube 60 has an opening 61 below the level of the top of the cup 58, and this overflow-tube projects through the bottom of the cup 58 and is in alinement with an aperture 62 in the base-ring 53, so that oil passing therethrough may return to the reservoir.

When the upper end of the tube 61 is in line with the nipple 57, as shown in Fig. 2, its opening 61 will be laterally disposed, so that oil cannot pass through it from the nipple. In the present instance the base-ring 53, cup 58, and tubes 56 and 59 are integral and provided with a head 63. The cap 52, which is in threaded engagement with the head 63, serves to secure the glass 51 in position.

The pipe 50 is connected to the tube 56 and is provided with a suitable packing 63 at such connection to insure a tight joint. A pipe 65 is connected in a similar manner to the discharge-tube 59, and this pipe 65 discharges into a passage 66 in the body 15. The passage 66 enters a valve-chamber 67, which is provided with suitable seats 68, to which are adapted the upper and lower gravity-valves 69. A passage 70 leads from the chamber 67 to the pump 14, which is provided with a discharge-passage 71, entering a chamber 72, provided with gravity-valves 73 similar to the valves 69. A suitable port 74 leads from the chamber 72 above the valves 73 and discharges into the tube 16, as shown in Fig. 4. The valve-chambers 67 and 72 are closed by suitable plugs 75.

In the operation of the device as the plungers 22 and 23 are reciprocated oil is drawn in by the suction of the plunger 22 past the valve 44 and is then forced past the valve 47 to the tube 50 on the return stroke. As the oil rises in the tube 50 it enters the tube 56 of the sight-feed device and finally drops from the nipple 57 into the cup 58. The nipple 57 is so located as to be visible through the sight-feed glass, so that the rate of delivery of the pump 13 may be readily observed. As the oil enters the cup 58 it passes therefrom through the discharge-tube 59 and entering the pipe 65 and passage 66 is drawn past the valves 69 by the suction of the pump 14 and is finally discharged by the return stroke past the valves 72 to the part to be lubricated. Inasmuch, however, as the capacity of the pump 13 is greater than that of the pump 14 oil in excess of the capacity of the pump 14 will be delivered thereto, so that the oil will back up in the trap 58 and rise therein until it reaches the level indicated by the dotted line in Figs. 1 and 2, when it will overflow through the opening 61 and be diverted from the pump 14. In the present embodiment of the invention the excess oil drops back into the reservoir through the aperture 62. By reason of this arrangement there is supplied to the pump 14 a greater quantity of oil than can be handled thereby, and hence there is always a supply of oil for such pump equal to the capacity thereof, or at least as much as it will deliver, thereby avoiding the sucking of air by the delivery-pump, as would be the case if a supply of oil less than its capacity were delivered thereto.

The outlet of the overflow-tube 60 is also visible through the sight-feed glass. It follows from this arrangement that the rate of delivery by the pump 14 may be readily ascertained by noting for a given time—say for a minute—the difference between the drops falling from the nipple 57 and from the overflow-tube 60. If, for example, the nipple 57 shows a rate of four drops per minute and the overflow-tube a rate of one drop per minute, this will indicate a rate of delivery of oil by the pump 14 to the part being lubricated of three drops per minute. Inasmuch as the adjustment of the stroke of the pump-plungers is effected simultaneously and to the same degree, the relative capacities of the pumps remain unchanged when the length of stroke is varied to vary the amount of oil fed. In other words, a greater quantity of oil is always delivered by the pump 13 than can be handled or discharged by the pump 14, and it is immaterial so far as this is concerned whether the rate of delivery of the pumps be different owing to difference in size thereof or for any other reason, and the oil-trap serves as an equalizer in that it equalizes the quantity of oil delivered by the pump 13 to the capacity of the pump 14.

By reason of the overflow-tube 60 the oil is prevented from backing up into the tube 56 and pipe 50, so that the sight-feed device is always operative to disclose the rate of delivery of the pumps.

Where the lubricator is employed for forcing oil to a part against pressure, as to the cylinder of an engine, the valves of the pump are arranged in pairs, as shown and described, so that in case one valve becomes inoperative—as, for instance, by being held from its seat by foreign matter—the other valve will continue to operate and prevent the passage of steam into the reservoir. It is obvious that the device is not limited in its application to such association, but may also be used when it does not operate against pressure.

Having described my invention, what I claim is—

1. In a lubricator, the combination with a pair of pumps of unequal capacity, of an oil-equalizer constantly maintaining a supply of oil for and to the full capacity of the pump of lesser capacity.

2. In a lubricator, the combination with a reservoir, of a pair of connected pumps, and means for diverting the oil delivered by one pump to the other in excess of the full capacity of such other pump.

3. In a lubricator, the combination with a reservoir, of a pair of coöperating pumps one of which discharges oil to and in excess of the capacity of the other pump, and means between the pumps for diverting the excess oil.

4. In a lubricator, the combination with a reservoir, of a pair of coöperating pumps, one of which delivers oil to and is of greater capacity than the other, and means between the pumps for maintaining a supply of oil to the full capacity of the pump of lesser capacity and for returning the excess oil to the reservoir.

5. In a lubricator, the combination with a pair of pumps of unequal capacity, of means between the pumps for maintaining a supply of oil equal to the full capacity of the pump of lesser capacity and for returning to the reservoir the oil in excess of its capacity.

6. In a lubricator, the combination with a reservoir, of a pair of coöperating pumps one of which delivers oil to and is of greater capacity than the other, and a trap between the pumps for maintaining a supply of oil at least equal to the full capacity of the said other pump.

7. In a lubricator, the combination with a reservoir, of a pair of coöperating pumps one of which delivers oil to and is of greater capacity than the other, and a trap for maintaining the connection leading therefrom to the pump of lesser capacity full of oil and having an overflow for diverting the excess oil.

8. In a lubricator, the combination with a reservoir, of a pair of pumps one of which is of greater capacity than the other, and a trap between the pumps consisting of a cup having an overflow into the reservoir and a discharge-opening, a drip-tube discharging into the cup and connected to the pump of greater capacity, a connection leading from the discharge-opening to the other pump, and means for regulating the stroke of the pumps.

9. In a lubricator, the combination with a reservoir, of a pair of pumps, a sight-feed glass, a trap therein having an overflow and a discharge-opening, a drip-tube connected with one pump and discharging into the trap, and a connection leading from the discharge-opening of the trap to the other pump.

10. In a lubricator, the combination with a reservoir, of a pair of pumps of different capacities, a sight-feed glass, a trap located therein and consisting of a cup having an overflow-tube and a discharge-opening, a drip-tube connected to the pump of greater capacity and discharging into the cup, and a connection between the discharge-opening of the cup and the other pump, the dropping of oil from the said tubes being visible through the sight-feed glass.

11. In a lubricator, the combination with a pair of pumps of unequal capacity, of a combined oil-equalizer and sight-feed device.

12. In a lubricator, the combination with a reservoir, of a pair of connected pumps of different capacities, and a sight-feed device indicating the difference in the rate of delivery of the pumps.

13. In a lubricator, the combination with a reservoir, of a pair of coöperating pumps, a sight-feed device between the pumps, and a trap therein having an overflow.

14. In a lubricator, the combination with a reservoir, of a pair of connected pumps of different capacities, and a sight-feed device provided with means for indicating the difference in capacity of the pumps.

15. In a lubricator, the combination with a reservoir, of a pair of pumps of different capacities, means for regulating the stroke of the pumps, a sight-feed glass and a trap therein having an overflow for indicating the difference in the rate of delivery of the pumps.

16. In a lubricator, the combination with a pair of coöperating pumps of unequal capacity, of a sight-feed device, a trap therein comprising a cup having a discharge-opening and an overflow-opening above the discharge-opening, a connection from the pump of greater capacity discharging into the cup, and a connection between the discharge-opening of the cup and the other pump.

17. In a lubricator, the combination with a reservoir, of a pair of reciprocating pumps of different capacities, means for simultaneously varying the stroke of the pump-plungers, a sight-feed glass, a cup located therein and having an overflow-tube visible through the glass and a discharge-opening, a visible drip-tube discharging into the cup and connected with the pump of greater capacity, and a connection between the discharge-opening of the cup and the other pump.

18. In a lubricator, the combination with a pair of coöperating pumps, means for actuating the pump-plungers, and means for simultaneously regulating the stroke of the plungers.

19. In a lubricator, the combination with a reservoir, of a pair of coöperating reciprocating pumps having connected plungers, an actuating-rod to reciprocate the plungers, and an adjustable abutment on one of the plungers for simultaneously regulating the stroke of the plungers.

20. In a lubricator, a pair of coöperating pumps having reciprocating plungers, a bar providing a rigid connection between the plungers, an adjustable abutment on one of the plungers, a reciprocating rod, and an arm on the rod coöperating with the said connection and the abutment to reciprocate the plungers.

In testimony whereof I affix my signature in presence of two witnesses.

IVAR A. RANDEL.

Witnesses:
ARTHUR B. SEIBOLD,
ELIZABETH MOLETOR.